United States Patent [19]
Wirth, Jr.

[11] Patent Number: 4,909,292
[45] Date of Patent: Mar. 20, 1990

[54] BORING, MORTISING, TENONING AND DUPLICATING WOODWORKING MACHINE

[76] Inventor: John Wirth, Jr., 5604 Alameda Pl., NE., Alburqueque, N. Mex. 87113

[21] Appl. No.: 325,526

[22] Filed: Mar. 20, 1989

[51] Int. Cl.⁴ .............................................. B27M 3/00
[52] U.S. Cl. .................... 144/144 R; 144/84; 144/87; 144/372; 409/89; 409/108; 409/124
[58] Field of Search ............... 144/82, 84, 87, 136 R, 144/137, 372; 409/89, 108, 124, 84

[56] References Cited

U.S. PATENT DOCUMENTS

| | | |
|---|---|---|
| 451,165 | 4/1891 | Zimmerman . |
| 601,194 | 3/1898 | Zimmerman . |
| 778,521 | 12/1904 | Wheat . |
| 965,013 | 7/1910 | Reitz . |
| 1,174,835 | 3/1916 | Durkee . |
| 1,235,476 | 7/1917 | Hoff . |
| 1,494,016 | 5/1924 | Prescott . |
| 1,602,336 | 10/1926 | Carter . |
| 2,291,177 | 7/1942 | Vanderveld . |
| 2,766,561 | 10/1956 | Carlson . |
| 2,836,937 | 6/1958 | Carnelius . |
| 3,325,948 | 6/1967 | Gonke . |
| 3,591,989 | 7/1971 | Granbe . |
| 3,866,539 | 2/1975 | Gasser . |
| 4,163,465 | 8/1979 | Strong .................. 144/87 |
| 4,509,572 | 4/1985 | L'Archer .............. 144/84 |
| 4,593,735 | 6/1986 | Wirth, Jr. ............. 144/84 |
| 4,749,013 | 6/1988 | Ducate, Sr. ........... 144/84 |
| 4,763,706 | 8/1988 | Rice et al. ............ 144/84 |

Primary Examiner—W. Donald Bray
Attorney, Agent, or Firm—Cushman, Darby & Cushman

[57] ABSTRACT

A boring, mortising, tenoning and duplicating woodworking machine including a horizontally movable workpiece support platform and vertically movable cutting tool support member. A tracing element is preferably mounted to the cutting tool support structure for tracing an object mounted to the workpiece support platform so that the object can be duplicated in the workpiece. A series of apertures are defined in the cutting tool support structure so that exhaust air from the engine can facilitate the removal of debris from the cutting tool/workpiece interface. Further a guard is provided for protecting the operator from flying wood chips and the like and wiper elements are mounted to wheels of the workpiece support platform to maintain the tracks of the workpiece support platform clear of wood chips and debris which would hinder the cutting operation.

41 Claims, 5 Drawing Sheets

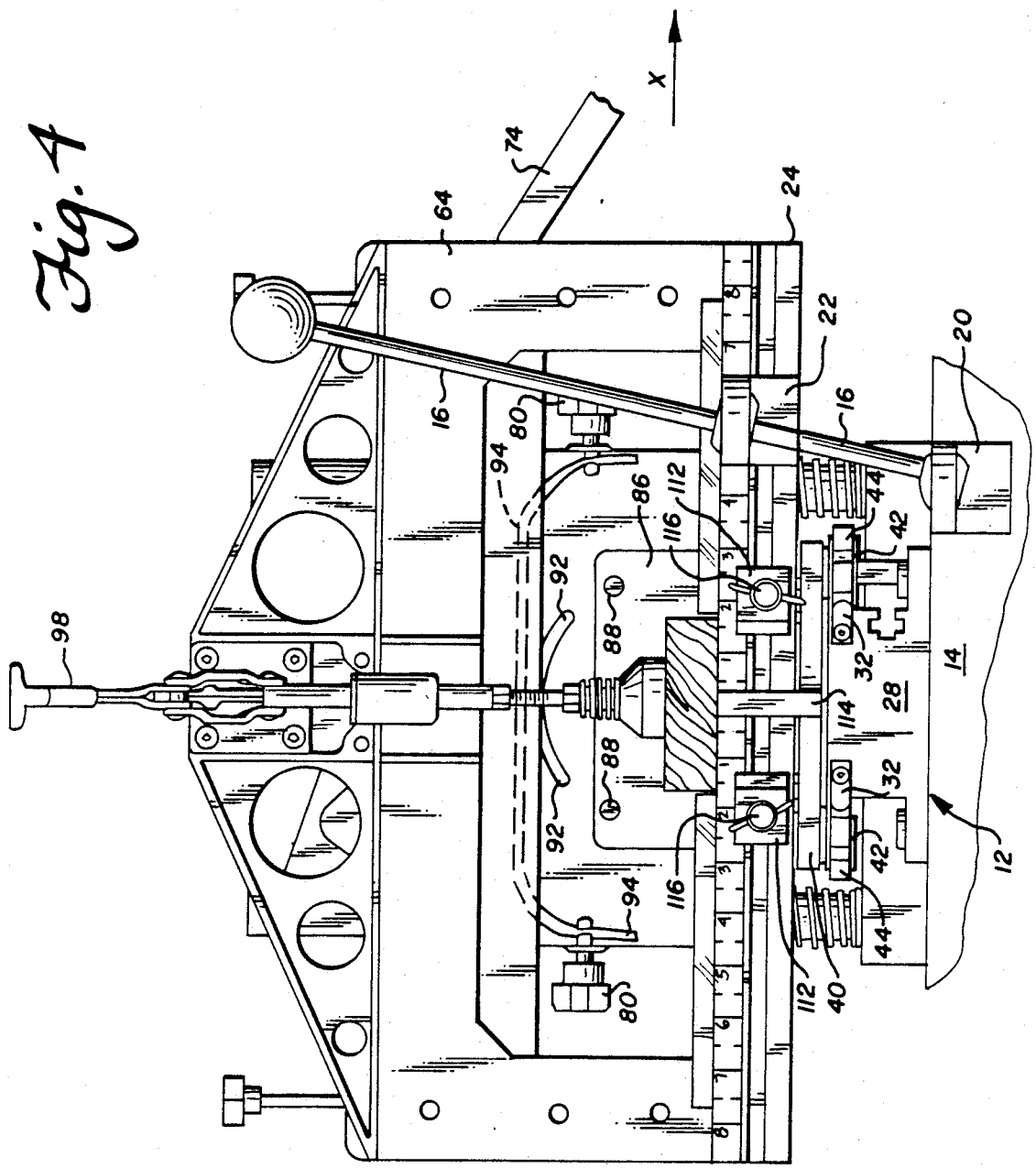

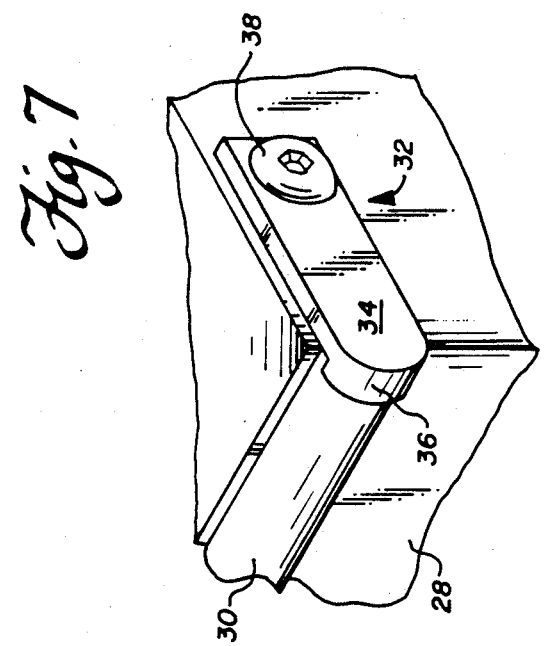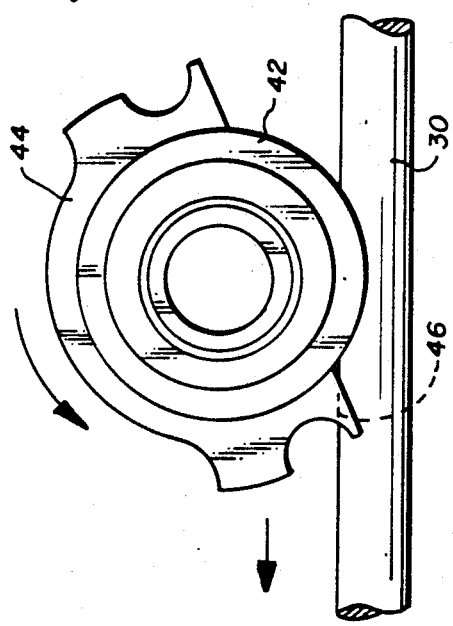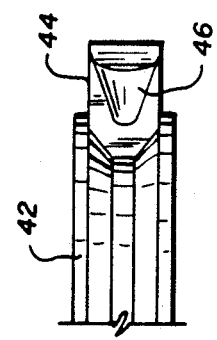

BORING, MORTISING, TENONING AND DUPLICATING WOODWORKING MACHINE

BACKGROUND OF THE INVENTION

1. Field of the Invention

The present invention relates to apparatuses for woodworking and for three-dimensional reproduction of an object and, more particularly, to a woodworking apparatus which enables relative movement in three-dimensions between a cutting tool and a workpiece whereby three-dimensional reproduction of an object can be effected.

2. Description of the Related Art

Power driven woodworking machines and power tools have been available for a number of years and have been used to facilitate woodworking by hobbyists and professionals alike. However, many of these machines are complex, difficult to assemble and have tool and work carriages that are cumbersome to manipulate. Because of their complexity, these machines have been relatively expensive as well as difficult to operate. Thus, there has remained a need for a versatile woodworking machine which is easily operated, inexpensive and durable in continuous use.

The woodworking machine described in my earlier U.S. Pat. No. 4,593,735 provided a power driven woodworking tool capable of boring, mortising, tenoning, and duplicating a three-dimensional object and which was compact in size, had a manageable weight and a relatively simple construction. A unique and advantageous feature of my earlier machine was that a single operator could effect simultaneously motion of the cutting tool in a vertical plane and motion of the workpiece in a horizontal plane. Further, my earlier machine provided a follower or tracing element for following or tracing a three-dimensional object whereby duplication of the three-dimensional object in the workpiece with the cutting tool was possible. That is not to say, however, that improvement of my earlier machine is not possible and indeed the present invention constitutes an improvement of the basic structure and characteristics of machine described in the above-identified patent.

More particularly, while my earlier machine enabled motion of the cutting tool in a vertical plane, the motion of that cutting tool was provided with a parallelogram-like motor and cutting tool support which was relatively large and complex. Therefore, it would be desirable to provide a mounting structure for a cutting tool and which is relatively compact and simple to assemble and operate.

Further, my earlier machine employed V-shaped wheels and tracks to enable motion of the workpiece platform in a horizontal plane. However, the V-shaped tracks were mounted to the platform components with a series of bolts or the like along the length thereof and thus removal of a track for repair or replacement was difficult and time consuming. In addition such V-shaped tracks are expensive to provide. It would therefore be desirable to provide tracks for the platform which are easy to mount and remove and which are relatively inexpensive to incorporate in the machine.

Even further, in my earlier machine a mechanism was provided for minimizing interference of wood chips and the like with motion of the workpiece platform. More particularly, in my earlier machine, as noted above, track and wheel elements were employed to allow motion of the workpiece platform in the X and Y directions. In order to prevent interference of wood chips with the motion of the wheels on the tracks, a wiper element was mounted to each of the wheels. These wiper elements had a substantially triangular shaped cross-section for engaging and wiping the tracks. Because the wipers were slidably mounted to the wheels, motion of the wheels would cause the wiper to swing into contact with the track and to wipe the track in advance of the wheel. Motion of the wheel in the opposite direction would result in the wiper again pivoting about the wheel into contact with the track in advance to the wheel. The wipers were triangular in cross-section so as to accommodate the particular shape of the tracks employed in my earlier machine.

As noted above, it would be desirable to provide an improved track structure in a woodworking machine. It would also be desirable to provide wiper elements which can effectively wipe such improved tracks in advance of the wheels of the platform so as to facilitate smooth motion of the workpiece platform.

Further, when a woodworking machine such as my earlier woodworking machine is employed, wood chips, particles and the like can be ejected from the work surface by the cutting tool. These wood chips and fragments can be projected towards the operator and can also obscure view of the workpiece.

It would therefore be desirable to provide a means for protecting the operator from flying wood shavings, chips and the like as well as a means for cleaning such debris from the workpiece/cutting tool interface.

Another problem experienced with many woodworking machines is that as the cutting tool is employed to cut the workpiece, the workpiece tends to rub the cutting tool support. This rubbing not only risks damage to the workpiece and/or the cutting tool support but the friction between the support and the workpiece can hinder effective wood cutting. It would therefore be desirable to provide a structure for minimizing the likelihood of damage or frictional interference caused by the workpiece rubbing the cutting tool support.

It would further be desirable to provide a measuring system in a woodworking machine whereby motion relative to a center line of the workpiece platform can be monitored so that workpieces can be quickly and properly placed thereon and cut.

SUMMARY OF THE INVENTION

It is an object of the present invention to provide a woodworking machine which is an improvement over my earlier machine by virtue of incorporating structures capable of providing the advantageous functions noted above. In particular, in accordance with the present invention, a woodworking machine is provided wherein the cutting tool mounting structure is slidably mounted on first and second vertical poles so that simple vertical motion of the cutting tool relative to the base of the machine and the workpiece platform is possible.

Another object of the present invention is to provide rod elements which are clamped to the workpiece platform to define semi-circular tracks for correspondingly shaped wheels on the workpiece platform. Such clamped rod elements can easily be removed and replaced and are themselves relatively easy to manufacture and hence are inexpensive.

It is a further object of the present invention to provide a woodworking machine which protects the operator from flying wood chips and similar debris by providing a flexible guard between the cutting tool and the operator so as to shield the operator from such flying debris.

Further, in accordance with the present invention, apertures are preferably provided in surrounding relation to the cutting tool so that exhaust air from the motor which rotates the cutting tool can be directed through the cutting tool support to the workpiece/cutting tool interface. In this manner, debris from cutting the workpiece is blown free from the workpiece/tool interface. In addition, in order to minimize the likelihood that such debris will interfere with the motion of the workpiece platform, wipers are provided for the platform wheels. However, unlike the wipers provided with my earlier machine, because the tracks provided in accordance with the present invention are round in configuration, the wipers provided in accordance with the present invention have a cross-section for engaging a semi-circular track.

Yet another object of the present invention is to provide a rub plate structure in surrounding relation to the cutting tool which provides a surface of minimum friction which the workpiece may engage and rub without damaging the workpiece or hindering the cutting operation. Preferably, the rub plate is removable so that if it becomes worn, the rub plate can be replaced so that the advantageous characteristics of the same can continue to be enjoyed.

Even further, in order to provide close monitoring of the disposition of the workpiece and the cutting tool and to enable quick, accurate mounting of the workpiece, zero center measuring tapes are incorporated into the surface of the workpiece platform.

Other objects, features, and characteristics of the present invention, as well as the methods of operation and functions of the related elements of the structure, and the combination of parts and economies of manufacture, will become more apparent upon consideration of the following description and the appended claims with reference to the accompanying drawings, all of which form a part of this specification, wherein like reference numerals designate corresponding parts in the various figures.

BRIEF DESCRIPTION OF THE DRAWINGS

FIG. 4 is a front elevational view of the machine provided in accordance with the present invention;

FIG. 5 is a broken-away top plan view showing a wiper provided in accordance with the present invention mounted to a roller and engaging a rod element;

FIG. 6 is side elevational view of a wiper and wheel provided in accordance with the present invention, partly broken away for clarity, showing the shape of the track engaging surface; and FIG. 7 is a broken away view showing a track mounting clamp provided in accordance with the present invention.

DETAILED DESCRIPTION OF THE PRESENTLY PREFERRED EXEMPLARY EMBODIMENT

Figure 1:
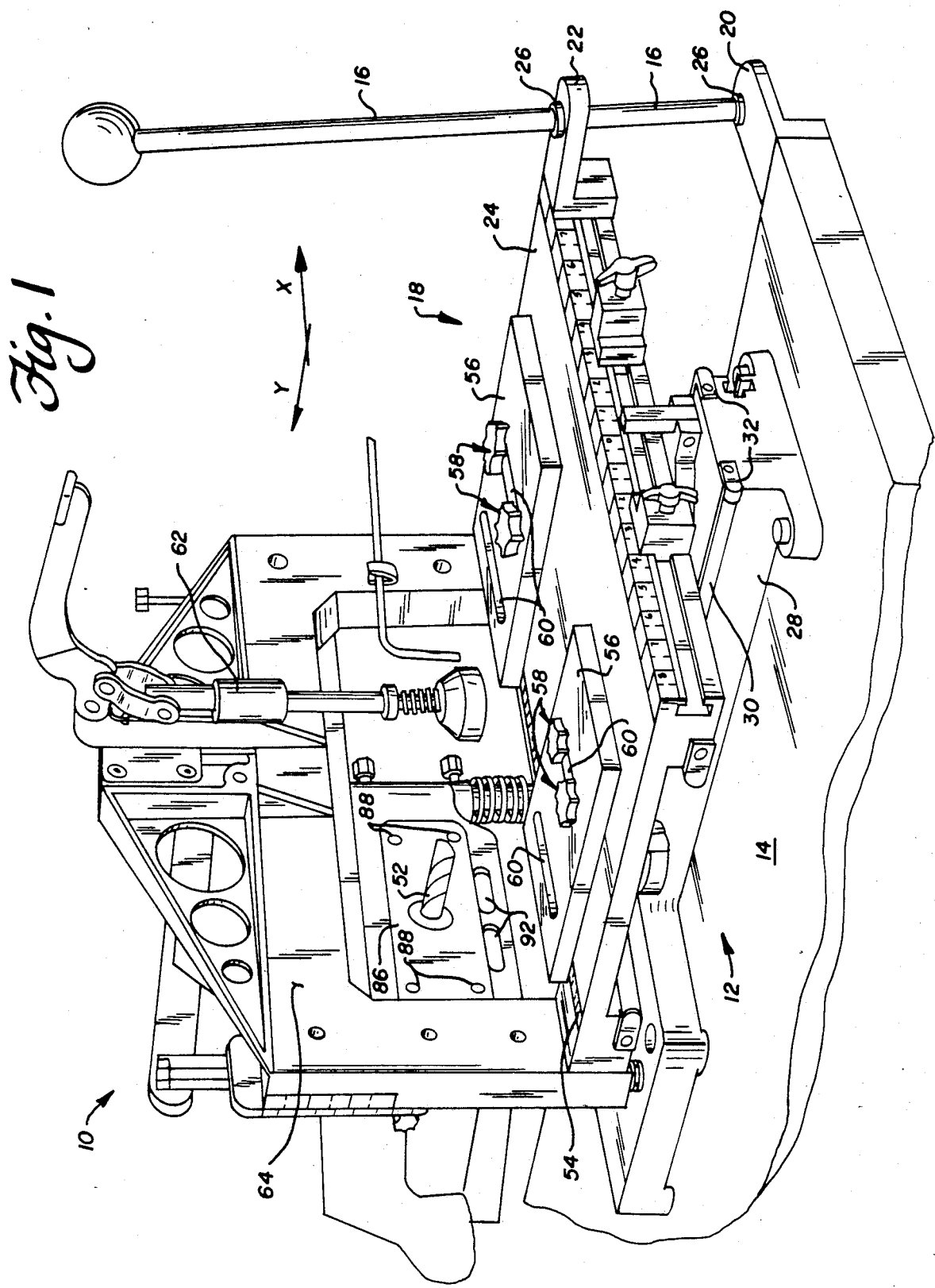
FIG. 1 is a front perspective view of a woodworking machine provided in accordance with the present invention.
Figure 2:
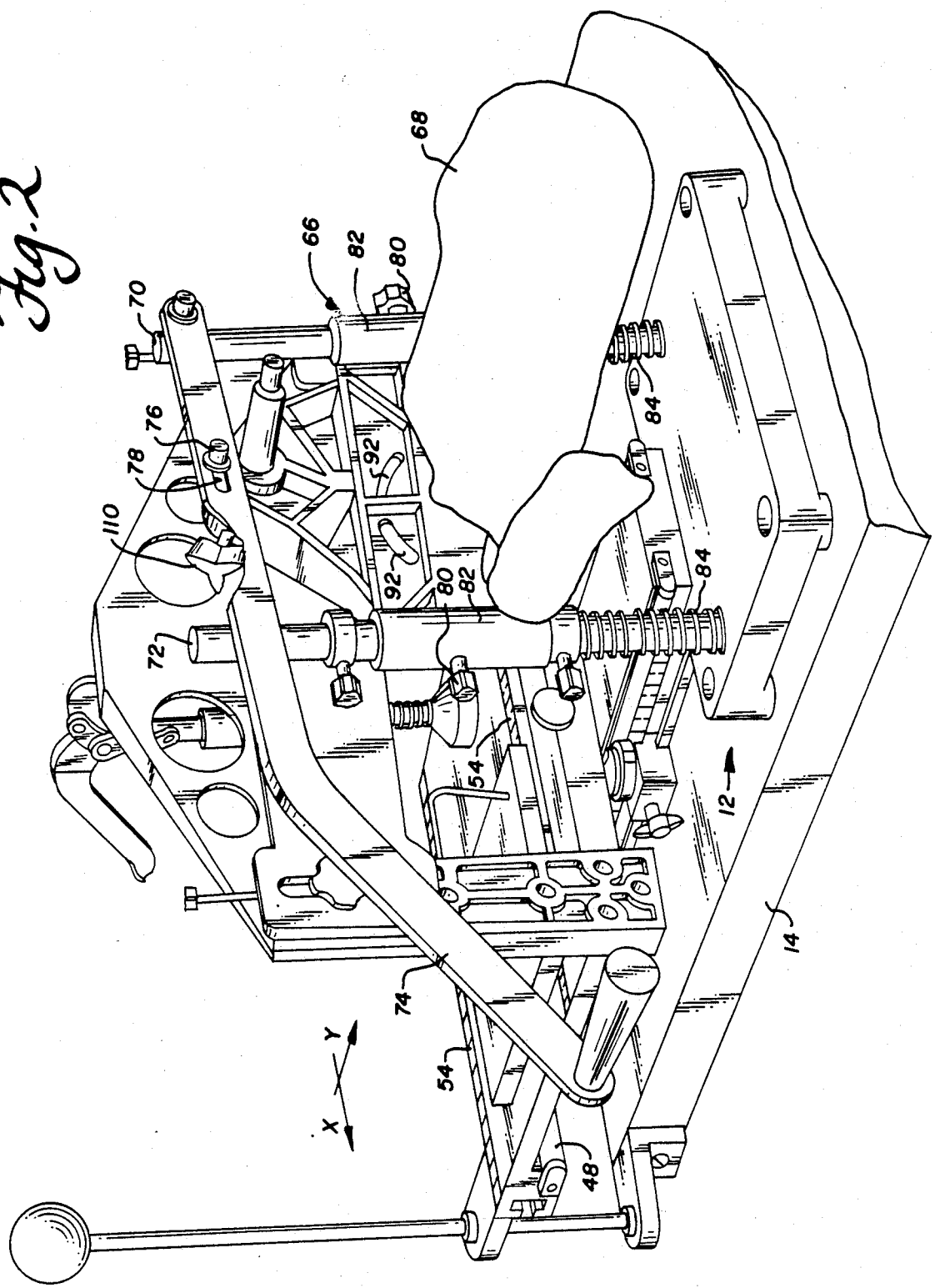
FIG. 2 is a rear perspective view of the machine of FIG. 1.

The woodworking machine provided in accordance with the present invention can be seen for example in the perspective views of FIGS. 1 and 2. The machine 10 includes a base 12 which can be positioned on a work table or a work bench 14 of suitable height and stability and secured thereto. A joy stick 16 or the like is provided for moving the workpiece platform, shown generally at 18, relative to the base 12 of the machine 10. More particularly, a joy stick bottom mounting element 20 is fixedly secured to the base of the machine and/or the work bench 14 to which the machine base has been fastened (as shown). A second joy stick mounting structure 22 is fixedly secured to the workpiece receiving plate 24 of the platform 18. The joy stick is rotatably mounted to the first and second mounting structures by means of a spherical bearing 26 (FIG. 3), for example, mounted in a bearing seat (not shown in particular).

A track mounting structure 28 is defined longitudinally of the base 12 and includes first and second track elements 30. The track elements are preferably rod-like elements which are mounted into correspondingly shaped groves defined along the side walls of the track mounting structure 28. The rods are clamped in the grooves by clamping elements 32 which are shown in detail in FIG. 7. The clamping elements 32 preferably include an elongated plate portion 34 and curved lip portion 36 for engaging the end of the responsive rod-shaped track element 30 and are fastened to the tracking mounting structure 28 by means of a screw, bolt or the like 38 which is inserted through an appropriately disposed aperture in the plate portion 34. Thus, the track elements 30 can be placed in the correspondingly shaped groves and the clamping elements 32 screwthreadedly attached to the mounting structure 28 so as to fixedly secure the track elements 30 in place. However, if the tracks become damaged or the operator wished to change the same, the clamping elements 32 can be quickly and easily loosened by unscrewing the screw or the like 38, removing the track element and replacing the same with a track element of like dimensions.

An intermediate platform plate 40 (FIGS. 3 and 4) is slidably mounted to the track mounting structure 28. More particularly, a platform plate 40 is provided which includes wheel elements 42 having a track engaging surface that corresponds in shape to the exposed portions of the tracks. Preferably four such wheels are provided on the bottom surface of the platform plate so that the intermediate platform can slide longitudinally of the base along the tracks 30.

With reference to FIGS. 5 and 6, in order to prevent the accumulation of wood chips and similar debris from hindering movement of the intermediate platform plate 40 relative to the base 12, wipers 44 are mounted to each of the wheel elements 42 and are slidable relative thereto so that as the wheels rotate and roll along tracks 30, the wipers 44 engage the tracks 30 in advance of the wheels 42 and wipe wood chips and similar debris from the same. As can be seen in FIG. 6, the track engaging surface of wiper 44 is semi-circular for closely engaging the exposed, semi-circular portion of track 30. Thus, the debris will not contaminate the area of contact between the wheel and the tracks and, accordingly, the risk of derailment of the intermediate platform plate 40 or friction which hinders smooth translation of the intermediate platform plate 40 relative to the base 12 is minimized. Wipers 44 can be formed of any suitable material, for example, plastic which has been injection molded.

Four additional wheels 46 are mounted to the upper surface of the intermediate platform plate 40 and have a shape corresponding to that of the lower wheels 42. Wheel wipers 44 are preferably mounted to the upper wheels 46 as well.

The workpiece receiving plate 24 also includes track elements 48 extending therealong in a direction substantially perpendicular to the track elements 30 mounted on the track mounting structure 28 of the base 12 of the woodworking machine 10. Tracks 48 are preferably defined in a cutout portion 50 of the workpiece receiving plate 24 and are spaced apart so as to slidably engage the upper wheels 46 of the intermediate platform 40.

With such a structure, motion of the joy stick 16 towards and away from cutting tool 52 causes the upper, workpiece receiving plate 24 and the intermediate platform 40 slidably mounted thereto to move toward or away from the cutting tool (in the Y direction) along the tracks 30 provided on the base structure 12. Likewise, motion of the joy stick 16 back and forth in front of the cutting tool 52 (in the X direction) causes the workpiece receiving plate 24 to move relative to the intermediate platform 40 and hence transversely to tracks 30 of the base 12 of the woodworking machine 10. Similarly, diagonal movement of the joy stick 16 will effect simultaneous motion of the intermediate platform 40 along the tracks 30 on the base and the workpiece receiving plate 24 relative to wheels 46 so that diagonal motion of the workpiece receiving plate 24 relative to the cutting tool 52 is possible. Thus, the workpiece support platform can be moved throughout the horizontal or X-Y plane.

As can be further seen in FIGS. 1, 2, and 4, zero center tapes 54 are preferably provided on the workpiece receiving plate 24 so as to be flush with the surface(s) of the same. The zero center tapes may be either etched in the surface of the workpiece receiving plate 24 or may be separate elements mounted in suitably defined grooves. Such zero center tapes 54 may be provided adjacent the cutting tool end of the plate as shown in FIG. 2 and along the front edge of the platform as shown in FIGS. 1 and 4 so that the quick and accurate disposition of the workpiece relative to the plate is possible. Additional zero center tapes may be provided on the upper surface of the workpiece platform as needed.

Figure 3:
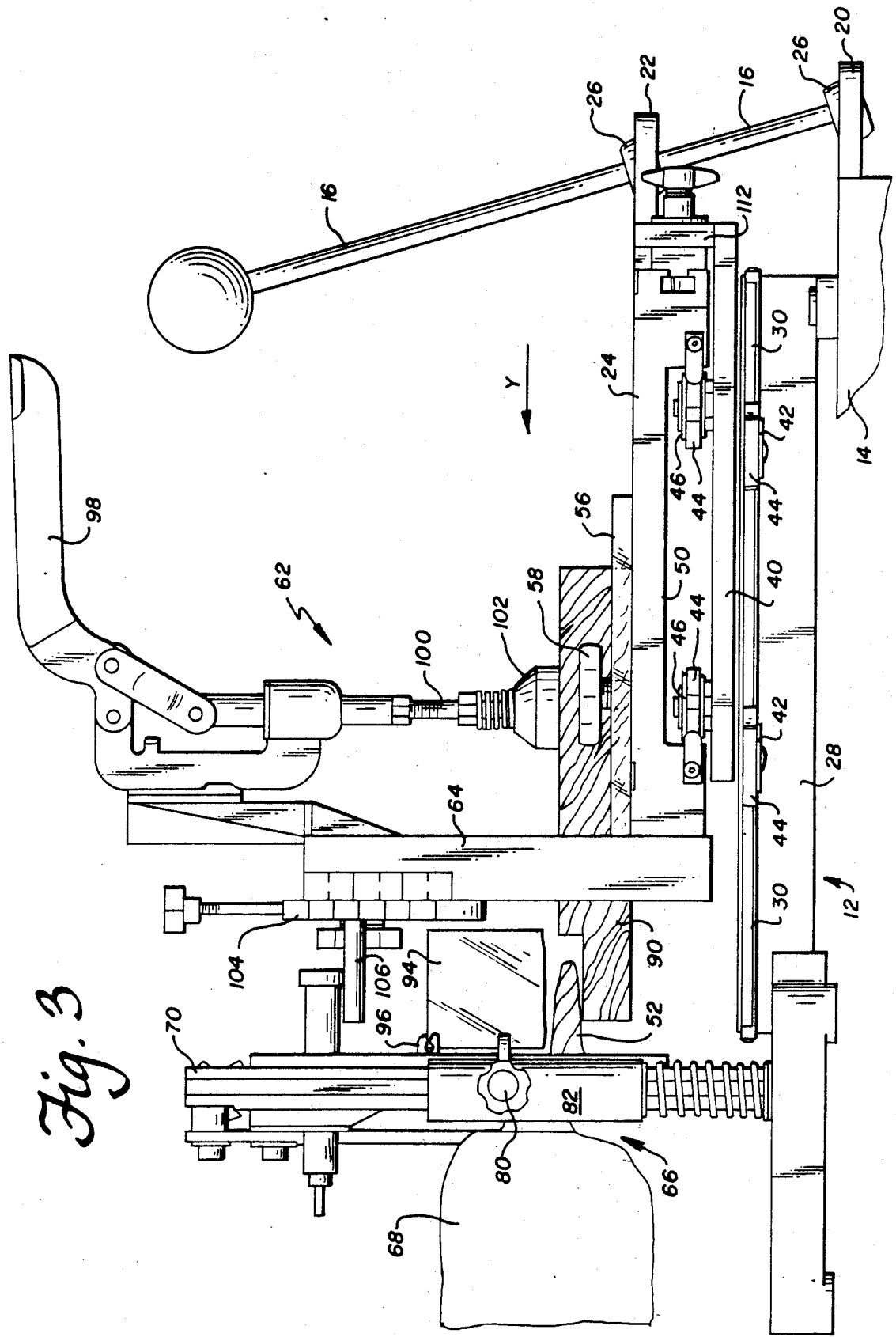
FIG. 3 is a side elevational view showing the machine provided in accordance with the present invention being operated to follow a three-dimensional pattern.

As can be seen in FIGS. 1, 3, and 4 the woodworking machine of the invention further includes several clamping elements for clamping a workpiece to the workpiece platform. More particularly, first and second clamping plates 56 are preferably removably mounted to the upper surface of the workpiece receiving plate 24 with screws, bolts or the like 58 which engage suitably disposed apertures and have enlarged heads to facilitate tightening and loosening the bolts 58 and hence the clamping plates 56. Further, each of the clamping plates has one or more slots 60 to enable adjustable positioning of the same on the platform 18 so that workpieces of various dimensions can be secured to the platform 18.

In addition, a vertical clamping member 62 is preferably provided and is secured to a U-shaped support structure 64 to which an object to be traced is mounted, as discussed more fully below.

The cutting tool 52 provided in accordance with the present invention is mounted to a cutting tool support structure 66. As shown in FIGS. 2 and 3, the cutting tool may have a motor 68 directed coupled thereto and also supported by the cutting tool support structure 66. In the alternative, the motor may be remote from the cutting tool but mechanically coupled thereto.

The cutting tool support 66 is slidably mounted to first and second vertical rods or columns 70, 72 so as to enable simple vertical movement of the cutting tool 52. More particularly, a cutting tool handle 74 is pivotally mounted at a first end thereof to a first rod 70 which is fixedly secured to the base 12. The handle 74 is also pivotally and slidably coupled to the cutting tool support 66 by means of a pin 76 and slot 78. Thus, movement of the handle 74 in a vertical direction lifts the cutting tool 66 support relative to the upper end of the first rod 70 and causes the cutting tool support 66 to slide vertically along first and second rods 70 and 72. The cutting tool 52 can be fixedly secured to the rods 70, 72 at a predetermined height by means of bolts or the like 80 which fictionally engage the rods through apertures defined in each of the rod receiving portions 82 of cutting tool support 66. Further, spring elements or the like 84 may be provided to dampen downward motion of the cutting tool support 66 so that release of the handle 74 will not result in a sudden downward movement of the cutting tool support 66 under the influence of its weight and the motor 68 attached thereto.

As can be seen in particular in FIG. 1, a removable rub plate 86 is mounted in surrounding relation to the cutting tool 52 and can be removed and replaced by removing screws, bolts or the like 88. Such a rub plate 86 is preferably formed from a lubricous plastic material so as to provide a smooth bearing surface for a workpiece 90 so that damage to the workpiece and/or friction between the workpiece and the cutting tool support structure 66 is avoided.

As can be further seen in FIGS. 1, 2 and 4 slots 92 are defined through cutting tool support 66. These slots 92 are preferably provided adjacent cutting tool 52 and in surrounding relation thereto. Further, the air outlet(s) (not shown) of the motor 68 which is coupled to the cutting tool are preferably disposed so as to be directed towards cutting tool support 66. Thus, as exhaust air from the motor 68 is expelled through the air outlet(s), at least some of the exhaust air will pass through apertures 92 and can blow wood chips, debris and the like from the cutting tool/workpiece interface. Accordingly, an accurate cut is possible, debris does not accumulate between the workpiece platform and the cutting tool support, and the cutting tool and the workpiece can be clearly seen at all times.

As shown in FIGS. 3 and 4 in accordance with the present invention, a flexible guard element 94 formed of clear plastic of any suitable composition is mounted to clamping elements 96 defined on the front face of the cutting tool support 66. In this manner, the guard 94 can be mounted to the cutting tool support 66 to protect the operator from flying debris and the like generated by contact of the cutting tool with the workpiece. Because a clamp-type mounting 96 is provided, however, the guard 94 can be easily removed for cleaning or replaced with a guard having other dimensions to accommodate varying wood cutting procedures and the operator's particular needs.

Referring now to FIG. 3, as noted above, a U-shaped bracket or support structure 64 is mounted to the forward end of the workpiece platform 18. A clamp assembly 62 is provided on the U-shaped support 64 and has a handle 98 and a threaded shaft 100 with a workpiece holding shoe 102 fitted thereto. The clamp may be employed for holding a workpiece 90 against the surface of the workpiece platform 18. The other side of U-shaped support 64 includes a mounting structure 104 for holding a three-dimensional object 106 which is to be reproduced. In the embodiment of FIG. 3, a tenon is shown for reproduction. The three-dimensional object 106 may be mounted to the holding structure 104 in any appropriate manner and the holding structure 104 itself is preferably removably and adjustably mounted to the U-shaped support 64 so that it can accommodate the particular three-dimensional object being copied. A tracer or follower 108 is mounted to cutting tool support 66 so as to extend forwardly therefrom. The tracer can be adjusted relative to support 66 by loosening a bolt or the like 110 (FIG. 2), moving the tracer 108 and again tightening bolt 110.

In use, then, a workpiece 90 is mounted to the workpiece platform 18 so as to extend forwardly therefrom a predetermined amount and the workpiece is clamped in position by the vertical clamping element 62 as well as by the clamping plates 56. The cutting tool 52 is then energized so as to rotate for cutting workpiece 90. The joy stick 16 and the handle 74 are then simultaneously operated so that the follower 108 comes into contact with the three-dimensional object 106. The joy stick 16 and the handle 74 are then manipulated so that the follower traces the three-dimensional outline of the three-dimensional object 106. The cutting tool 52 will likewise trace the shape of the three-dimensional object 106 into the workpiece 90 engaged therewith.

As can be seen in FIGS. 1 and 4, cams 112 can be mounted to the workpiece receiving plate 24 to engage stops 114 suitably provided on the base 12 so that only limited movement of the workpiece platform relative to the base 12 is possible. For example, a stop element 114 can be pivotally mounted to the base 12 as shown in FIG. 4 and can be rotated from a horizontal position to a vertical position such that in the vertical position the stop lies in the path of the cam elements 112. Then, as the workpiece receiving plate 24 is moved relative to the base 12, the cam elements 112 engage the stop 114 and prevent further movement of the workpiece in the horizontal plane. The cam elements 112 are slidably adjustable by loosening a bolt or the like 116, sliding the cam element 112 and again tightening the bolt 116 so that the allowed movement of the platform 18 relative to the base 12 can be adjusted as well.

While the invention has been described in connection with what is presently considered to be the most practical and preferred embodiment, it is to be understood that the invention is not to be limited to the disclosed embodiment, but on the contrary is intended to cover various modifications and equivalent arrangements included within the spirit and scope of the appended claims.

What is claimed is:

1. A woodworking machine comprising: a base member having at least one rod-like member fixedly secured thereto;
a workpiece support platform mounted to said base member so as to be movable relative thereto in a horizontal plane;
a cutting tool support structure mounted to said base member so as to be movable in a vertical plane relative thereto, said cutting tool support structure including at least one rod receiving portion for slidably receiving said at least one rod-like member, respectively, whereby said cutting tool support is slidable along said at least one rod-like member;
means for mounting a cutting tool to said cutting tool support;
a tracing element mounted to said cutting tool support structure vertically above said means for mounting a cutting tool;
means for mounting an object to be traced to said workpiece support platform; and
a handle mounted at a first end thereof so as to be pivotable relative to said base and slidably and pivotally coupled at a second point therealong to said cutting tool support whereby pivotal motion of said handle relative to said base vertically displaces said cutting tool support relative to said at least one rod-like member,
whereby an operator can move said workpiece support platform in a horizontal plane with one hand and said cutting tool support structure in a vertical plane with another hand so that said tracing element can trace an object mounted to said workpiece support platform.

2. A woodworking machine comprising:
a base member;
a workpiece support platform mounted to said base member so as to be movable relative thereto in a horizontal plane;
a cutting tool support structure mounted to said base member so as to be movable in a vertical plane relative thereto;
means for mounting a cutting tool to said cutting tool support;
a motor mounted to said cutting tool support structure for rotating a cutting tool mounted to said cutting tool support structure, said cutting tool support structure having at least one aperture defined therethrough adjacent said cutting tool mounting means, said motor being mounted to said cutting tool support structure so that exhaust air therefrom is directed toward said cutting tool support structure, said exhaust air passing through said at least one aperture;
a tracing element mounted to said cutting tool support structure vertically above said means for mounting a cutting tool; and
means for mounting an object to be traced to said workpiece support platform,
whereby an operator can move said workpiece support platform in a horizontal plane with one hand and said cutting tool support structure in a vertical plane with another hand so that said tracing element can trace an object mounted to said workpiece support platform.

3. A woodworking machine as in claim 1, wherein said cutting tool support structure includes first and second cylindrical rod receiving portions and first and second rod-like members are fixedly secured to said base member, said rod receiving portions slidably receiving said first and second rod members whereby said cutting tool support is slidable along said rods.

4. A woodworking machine as in claim 1, further including spring means mounted to said rod members between said rod receiving portions of said cutting tool support and said base member.

5. A woodworking machine as in claim 1, further comprising means for locking said cutting tool support relative to said rod-like members.

6. A woodworking machine as in claim 3, further including a handle pivotally mounted at a first end thereof to said first rod-like member and slidably and pivotally coupled at a second point therealong to said cutting tool support whereby pivotal movement of said handle relative to said first rod member vertically displaces said cutting tool support relative to said first and second rod-like members.

7. A woodworking machine comprising:
a base member;
a workpiece support platform mounted to said base member so as to be movable relative thereto in a horizontal plane;
a cutting tool support structure mounted to said base member so as to be movable in a vertical plane relative thereto;
means for mounting a cutting tool to said cutting tool support;
a rub plate removably mounted to said cutting tool support in surrounding relation to said cutting tool mounting means;
a tracing element mounted to said cutting tool support structure vertically above said means for mounting a cutting tool; and
means for mounting an object to be traced to said workpiece support platform,
whereby an operator can move said workpiece support platform in a horizontal plane with one hand and said cutting tool support structure in a vertical plane with another hand so that said tracing element can trace an object mounted to said workpiece support platform.

8. A woodworking machine as in claim 1, wherein said workpiece platform comprises an intermediate plate mounted to said base member so as to be slidable in a first direction relative thereto and a workpiece receiving plate mounted to said intermediate plate so as to be slidable relative to said intermediate plate in a direction substantially perpendicular to said first direction.

9. A woodworking machine as in claim 8, wherein said intermediate plate and said workpiece receiving plate are slidably mounted relative to one another by means of engaging wheels and tracks.

10. A woodworking machine as in claim 9, wherein said base member includes first and second track elements mounted to a track mounting portion thereof and said intermediate plate includes at least four wheels mounted to a bottom surface thereof for engaging said track elements.

11. A woodworking machine as in claim 10, wherein an undersurface of said workpiece receiving plate includes first and second track elements mounted to a track mounting portion thereof, and upper surface of said intermediate plate includes at least four wheel elements for engaging said track elements of said workpiece receiving plate.

12. A woodworking machine comprising:
a base member;
a workpiece support platform mounted to said base member so as to be movable relative thereto in a horizontal plane, said workpiece platform comprising an intermediate plate mounted to said base member so as to be slidable in a first direction relative thereto and a workpiece receiving plate mounted to said intermediate plate so as to be slidable relative to said intermediate plate in a direction substantially perpendicular to said first direction, said intermediate plate and said workpiece receiving plate being slidably mounted relative to one another by means of engaging wheels and tracks, said base member including first and second track elements mounted to a track mounting portion thereof and said intermediate plate includes at least four wheels mounted to a bottom surface thereof for engaging said track elements, an undersurface of said workpiece receiving plate including first and second track elements mounted to a track mounting portion thereof, and upper surface of said intermediate plate includes at least four wheel elements for engaging said track elements of said workpiece receiving plate, said track elements comprises comprising rod-like elements mounted into grooves defined in said track mounting portions such that a semi-circular track surface is exposed;
a cutting tool support structure mounted to said base member so as to be movable in a vertical plane relative thereto;
means for mounting a cutting tool to said cutting tool support;
a tracing element mounted to said cutting tool support structure vertically above said means for mounting a cutting tool;
means for mounting an object to be traced to said workpiece support platform,
whereby an operator can move said workpiece support platform in a horizontal plane with one hand and said cutting tool support structure in a vertical plane with another hand so that said tracing element can trace an object mounted to said workpiece support platform.

13. A woodworking machine as in claim 12, wherein said rod-like track elements are mounted to said base member and to said workpiece receiving plate by means of clamping elements engaged with the ends thereof.

14. A woodworking machine as in claim 13, wherein each said clamping element includes a substantially plate-like portion, a lip portion extending at an angle of about 90° relative to said plate portion, and an aperture being defined through said plate portion whereby said clamping element can be screwthreadedly attached to said track mounting portions so that said lip portion and said plate portion engage and clamp a rod-like element thereto.

15. A woodworking machine as in claim 12, wherein each said wheel element has an outer circumferential surface substantially semi-circular in cross-section for engaging said rod-like track elements.

16. A woodworking machine as in claim 15, further including a wiper element mounted to each said wheel element, each said wiper being substantially C-shaped and sized so as to be slidably mounted to said circumferential surface of said wheel, each said wiper element including first and second track engaging portions which are substantially semi-circular in cross-section for engaging a said track element in advance of said respective wheel.

17. A woodworking machine comprising:
a base member;

a workpiece support platform mounted to said base member so as to be movable relative thereto in a horizontal plane;

at least one zero center tape mounted to said workpiece support platform so as to be flush with an upper surface thereof and such that the zero center of said tape is aligned with a central longitudinal axis of said workpiece support platform;

a cutting tool support structure mounted to said base member so as to be movable in a vertical plane relative thereto;

means for mounting a cutting tool to said cutting tool support;

a tracing element mounted to said cutting tool support structure vertically above said means for mounting a cutting tool; and means for mounting an object to be traced to said workpiece support platform, whereby an operator can move said workpiece support platform in a horizontal plane with one hand and said cutting tool support structure in a vertical plane with another hand so that said tracing element can trace an object mounted to said workpiece support platform.

18. A woodworking machine as in claim 1, further including first and second cam elements slidably mounted to said workpiece receiving plate and at least one stop element mounted to said base member whereby movement of said workpiece receiving plate relative to said base member is limited by engagement of said cam elements with said stop member.

19. A woodworking machine comprising:
a base member;
a workpiece support platform mounted to said base member so as to be movable relative thereto in a horizontal plane;
a cutting tool support structure mounted to said base member so as to be movable in a vertical plane relative thereto;
means for mounting a cutting tool to said cutting tool support;
a flexible, clear plastic guard element removably coupled to said cutting tool support vertically above said cutting tool mounting means so as to define an inverted U-shaped guard surrounding an upper periphery and side peripheries of a cutting tool mounted to said cutting tool support;
a tracing element mounted to said cutting tool support structure vertically above said means for mounting a cutting tool; and
means for mounting an object to be traced to said workpiece support platform,
whereby an operator can move said workpiece support platform in a horizontal plane with one hand and said cutting tool support structure in a vertical plane with another hand so that said tracing element can trace an object mounted to said workpiece support platform.

20. A woodworking machine as in claim 1, further including means mounted to said workpiece support platform for clamping a workpiece thereto.

21. A woodworking machine as in claim 1, wherein said means for mounting an object to be traced is provided on a U-shaped support defined on said workpiece support platform at a forward end thereof relative to and in facing relation to said cutting tool support.

22. A woodworking machine comprising;
a base member;
a workpiece support platform mounted to said base member so as to be movable relative thereto in a horizontal plane;
a cutting tool support structure mounted to said base member so as to be movable in a vertical plane relative thereto;
means for mounting a cutting tool to said cutting tool support;
at least one aperture defined through said cutting tool support structure adjacent said cutting tool mounting means; and
means mounted to said cutting tool support structure for directing a current of air toward and through said at least one aperture for removing debris from a workpiece/cutting tool interface of the machine.

23. A woodworking machine as in claim 22, wherein a motor is mounted to said cutting tool support structure for rotating a cutting tool mounted to said cutting tool support structure, said motor being mounted said cutting tool support structure so that exhaust air therefrom is directed toward said cutting tool support structure to provide said means for directing a current of air.

24. A woodworking machine as in claim 22, wherein said cutting tool support structure includes first and second cylindrical rod receiving portions and first and second rod-like members are fixedly secured to said base member, said rod receiving portions slidably receiving said first and second rod members whereby said cutting tool support is slidable along said rods.

25. A woodworking machine as in claim 24, further including a handle pivotally mounted at a first end thereof to said first rod-like member and slidably and pivotally coupled at a second point therealong to said cutting tool support whereby pivotal movement of said handle relative to said first rod member vertically displaces said cutting tool support relative to said first and second rod-like members.

26. A woodworking machine as in claim 22, further including a rub plate removably mounted to said cutting tool support in surrounding relation to said cutting tool mounting means.

27. A woodworking machine as in claim 22, wherein said workpiece platform comprises an intermediate plate mounted to said base member so as to be slidable in a first direction relative thereto and a workpiece receiving plate mounted to said intermediate plate so as to be slidable relative to said intermediate plate in a direction substantially perpendicular to said first direction.

28. A woodworking machine as in claim 27, wherein said intermediate plate and said workpiece receiving plate are slidably mounted relative to one another by means of engaging wheels and tracks.

29. A woodworking machine as in claim 28, wherein said base member includes first and second track elements mounted to a track mounting portion thereof and said intermediate plate includes at least four wheels mounted to a bottom surface thereof for engaging said track elements.

30. A woodworking machine as in claim 29, wherein an undersurface of said workpiece receiving plate includes first and second track elements mounted to a track mounting portion thereof, and upper surface of said intermediate plate includes at least four wheel elements for engaging said track elements of said workpiece receiving plate.

31. A woodworking machine as in claim 30, wherein said track elements comprise rod-like elements mounted into grooves defined in said track mounting portions such that a semi-circular track surface is exposed.

32. A woodworking machine as in claim 31, wherein said rod-like track elements are mounted to said base member and to said workpiece receiving plate by means of clamping elements engaged with the ends thereof.

33. A woodworking machine as in claim 32, wherein each said clamping element includes a substantially plate-like portion, a lip portion extending at an angle of about 90° relative to said plate portion, and an aperture being defined through said plate portion whereby said clamping element can be screwthreadedly attached to said track mounting portions so that said lip portion and said plate portion engage and clamp a rod-like element thereto.

34. A woodworking machine as in claim 31, wherein each said wheel element has an outer circumferential surface substantially semi-circular in cross-section for engaging said rod-like track elements.

35. A woodworking machine as in claim 34, further including a wiper element mounted to each said wheel element, each said wiper being substantially C-shaped and sized so as to be slidably mounted to said circumferential surface of said wheel, each said wiper element including first and second track engaging portions which are substantially semi-circular in cross-section for engaging a said track element in advance of said respective wheel.

36. A woodworking machine as in claim 1, wherein there are at least first and second rod-like members and at least first and second rod receiving portions.

37. A woodworking machine as in claim 36, wherein said handle is pivotally mounted at said first end thereof to said first rod-like member.

38. A woodworking machine as in claim 2, wherein said workpiece support platform and said base member are slidably mounted relative to one another by means of engaging wheel elements and track elements, and further including a wiper element mounted to at least one of said wheel elements, each said wiper element being substantially C-shaped and sized so as to be slidably mounted to an outer circumferential surface of said respective wheel element, each said wiper element including first and second track engaging portions for engaging a said track element in advance of said respective wheel element.

39. A woodworking machine as in claim 7, wherein said workpiece support platform and said base member are slidably mounted relative to one another by means of engaging wheel elements and track elements, and further including a wiper element mounted to at least one of said wheel elements, each said wiper element being substantially C-shaped and sized so as to be slidably mounted to an outer circumferential surface of said respective wheel element, each said wiper element including first and second track engaging portions for engaging a said track element in advance of said respective wheel element.

40. A woodworking machine as in claim 17, wherein said workpiece support platform and said base member are slidably mounted relative to one another by means of engaging wheel elements and track elements, and further including a wiper element mounted to at least one of said wheel elements, each said wiper element being substantially C-shaped and sized so as to be slidably mounted to an outer circumferential surface of said respective wheel element, each said wiper element including first and second track engaging portions for engaging a said track element in advance of said respective wheel element.

41. A woodworking machine as in claim 19, wherein said workpiece support platform and said base member are slidably mounted relative to one another by means of engaging wheel elements and track elements, and further including a wiper element mounted to at least one of said wheel elements, each said wiper element being substantially C-shaped and sized so as to be slidably mounted to an outer circumferential surface of said respective wheel element, each said wiper element including first and second track engaging portions for engaging a said track element in advance of said respective wheel element.

* * * * *